(12) United States Patent
Hedberg-Dirk et al.

(10) Patent No.: US 9,228,042 B2
(45) Date of Patent: Jan. 5, 2016

(54) POLYMER SCAFFOLD DEGRADATION CONTROL VIA CHEMICAL CONTROL

(71) Applicants: Elizabeth L Hedberg-Dirk, Albuquerque, NM (US); Shawn Dirk, Albuquerque, NM (US); Kirsten Cicotte, Albuquerque, NM (US)

(72) Inventors: Elizabeth L Hedberg-Dirk, Albuquerque, NM (US); Shawn Dirk, Albuquerque, NM (US); Kirsten Cicotte, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 14/147,983

(22) Filed: Jan. 6, 2014

(65) Prior Publication Data

US 2014/0121328 A1    May 1, 2014

Related U.S. Application Data

(60) Division of application No. 13/439,661, filed on Apr. 4, 2012, now Pat. No. 8,648,167, which is a continuation-in-part of application No. 12/943,803, filed on Nov. 10, 2010, now Pat. No. 8,809,212.

(60) Provisional application No. 61/280,875, filed on Nov. 10, 2009, provisional application No. 61/471,580, filed on Apr. 4, 2011.

(51) Int. Cl.
*C08G 63/52* (2006.01)
*C08F 222/10* (2006.01)

(52) U.S. Cl.
CPC ............. *C08F 222/10* (2013.01); *C08G 63/52* (2013.01)

(58) Field of Classification Search
None
See application file for complete search history.

(56) References Cited

U.S. PATENT DOCUMENTS 6,660,810 B1 * 12/2003 Ferruti et al. ................. 525/439

OTHER PUBLICATIONS

J. Grobelny (Polymer, 1995, 36 (22), 4215-4222).*
Curtis et al. (Ind. Eng. Chem. Prod. Res. Div. 1964, 3 (3), 218-221).*

* cited by examiner

*Primary Examiner* — Vu A Nguyen
(74) *Attorney, Agent, or Firm* — Gonzales Patent Services; Ellen M. Gonzales

(57) ABSTRACT

A variety of polymers and copolymers suitable for use as biologically compatible constructs and, as a non-limiting specific example, in the formation of degradable tissue scaffolds as well methods for synthesizing these polymers and copolymers are described. The polymers and copolymers have degradation rates that are substantially faster than those of previously described polymers suitable for the same uses. Copolymers having a synthesis route which enables one to fine tune the degradation rate by selecting the specific stoichiometry of the monomers in the resulting copolymer are also described. The disclosure also provides a novel synthesis route for maleoyl chloride which yields monomers suitable for use in the copolymer synthesis methods described herein.

11 Claims, 11 Drawing Sheets

|  | Catalyst | Reaction Temperature (°C) | % Fumerate | Tg (°C) | Mn |
| --- | --- | --- | --- | --- | --- |
|  | TsOH | 250 | 100 | -15.24 | 473 |
| Method A | TsOH | 85-110 | 33 | -40.38 | 728 |
|  | H$_2$SO$_4$ | 85-110 | 79 | -13.72 | 330 |
|  | ZnCl$_2$ | 85-110 | 89 | -18.66 | 824 |
|  | FeCl$_3$ | 85-110 | 87 | -37.58 | 1043 |
| Method B | TsOH | 50/85-110 | 55 | -13.78 | 2347 |
|  | H$_2$SO$_4$ | 50/85-110 | 71 | -13.65 | 1739 |

FIG. 3

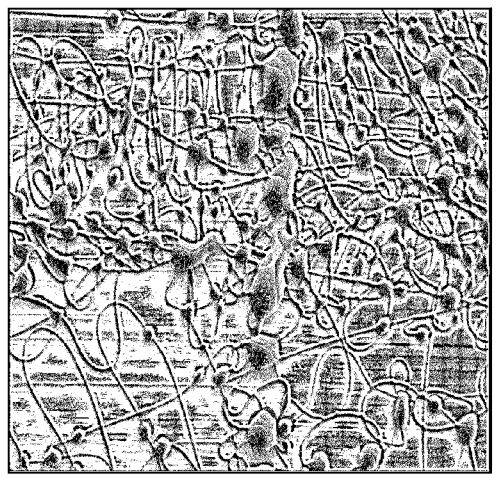
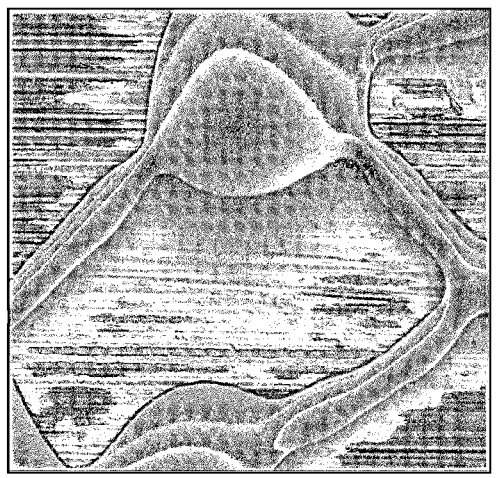
FIG. 11　　　　　　　　FIG. 12
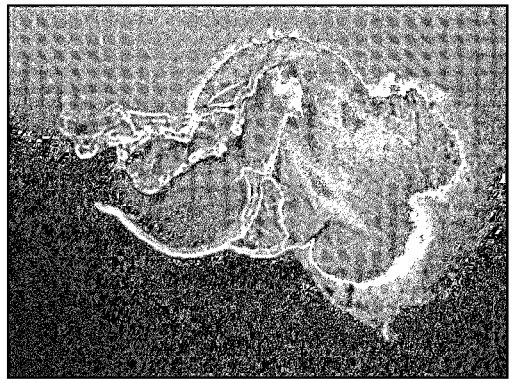
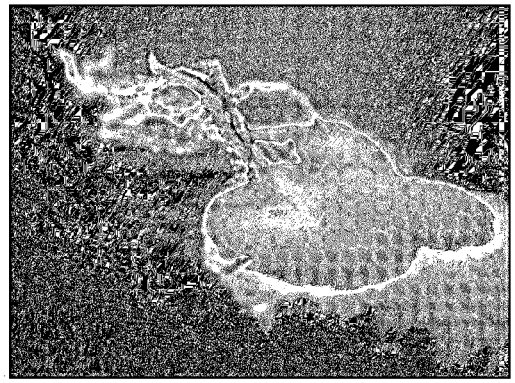
Top View　　　　　　　Side View
FIG. 13　　　　　　　　FIG. 14

POLYMER SCAFFOLD DEGRADATION CONTROL VIA CHEMICAL CONTROL

CROSS-REFERENCE TO RELATED APPLICATIONS

The following application is a divisional of U.S. patent application Ser. No. 13/439,661, filed Apr. 4, 2012, which is a continuation in part of co-pending U.S. patent application Ser. No. 12/943,803 filed Nov. 10, 2010, claims benefit of U.S. Provisional Application No. 61/280,875, filed Nov. 10, 2009. The following application also claims the benefit of U.S. Provisional Application No. 61/471,580 filed Apr. 4, 2011. All applications identified in this paragraph are hereby incorporated by reference.

STATEMENT REGARDING GOVERNMENT SPONSORED RESEARCH

This invention was made with Government support under contract no. DE-AC04-94AL85000 awarded by the U.S. Department of Energy to Sandia Corporation. The US. Government has certain rights in this invention.

BACKGROUND

Non-woven textiles formed from polymers are useful materials for a variety of applications including, but not limited to, general textile applications and specialty applications such as scaffolding materials for tissue engineering. Tissue scaffolds must be capable of mimicking native tissues to not only provide a temporary repair of damaged or diseased tissue, but also to promote the healing process. Furthermore, porosity is a significant parameter to evaluate when gauging the success of a particular scaffold because the cellular environment is crucial to cell viability and migration. Suitable porous bioengineered constructs and methods of forming the same are described in co-pending parent U.S. patent application Ser. No. 12/943,803, which is herein incorporated by reference.

Under certain circumstances, it may be desirable for the bioengineered constructs to be biodegradable, such that the bioengineered construct can form a scaffold for bone or other tissue formation that degrades once the new tissue is sufficiently formed. However, many of the previously described materials that are used to form bioengineered constructs have a very slow rate of degradation. For example, studies of poly(propylene fumarate) (PPF), a polymer commonly used in bioengineered construct application, show little or no degradation in vivo after 18 weeks and little or no degradation in vitro after 50 weeks. It will be appreciated that tissue regeneration typically takes place in significantly less time than this resulting in a tissue scaffold which can eventually hinder, rather than aid, the healing process. Accordingly, there is a need for bioengineered constructs formed from materials with significantly reduced biodegradation times.

Furthermore, it will also be appreciated that tissue generation rates can vary based on the type of tissue being generated (e.g., bone vs. cartilage, large repair vs. small repair). Accordingly, a tunable system that enables the formation of bioengineered constructs having a specific, predetermined biodegradation rate would be greatly desired.

SUMMARY

According to an embodiment, the present disclosure provides bioengineered constructs having specific, tunable biodegradation rates and methods and materials for forming the same.

BRIEF DESCRIPTION OF THE DRAWINGS

FIG. 3 is a table providing a summary of PPF and PPFcPM reaction conditions and polymer characterizations.

FIG. 11 shows the effect on polymer (50 wt %) after cross linking with Benzil (3 wt %), pun at 15 kV/15 cm and flow rate of 0.1 mL/hr zoomed out on larger area, beads and fibers.

FIG. 12 shows a node-like intersection of the polymer of FIG. 11 where "wetting" occurred.

FIG. 13 is a top view of the effect on mat from PPFcPM-BAPO collecting in the same area on the target.

FIG. 14 is a side view of the polymer shown in FIG. 13.

DETAILED DESCRIPTION

According to various embodiments the present disclosure provides bioengineered constructs having specific, tunable biodegradation rates and methods and materials for forming the same. As described in greater detail below, the constructs, methods, and materials are suitable for use in tissue regeneration applications where it is desired that a biocompatible scaffold degrade according to a specific, predetermined timeline. While the presently described methods are explained primarily in connection with electrospinning, it will be understood that the presently described methods are applicable for use with a wide variety of other patterning textile formation techniques including, but not limited to, microprojection, lithography, screen printing, stamping, microcontacting printing, printing, meltblowing, melt spinning, dry spinning, wet sinning, gel spinning, single head electrospinning, multihead electrospinning, or flash spinning. Furthermore, with regard to the spinning techniques, the methods are applicable for use with all spinning techniques with or without a method to preferentially orient the fibers, including, but not limited to methods that include the use of a mandrel. The methods are also applicable for use with all spinning techniques with or without a method to decrease the fiber diameter, including, but limited to methods that incorporate stretching.

According to an embodiment, the fibers and textiles of the present invention are suitable for use in tissue scaffolding applications. For use as a scaffold for tissue engineering, the polymer needs to be easily processed into a highly porous scaffold with a high surface area to volume ratio and an interconnected pore network. Previous research groups have fabricated PPF scaffolds using solvent casting/salt leaching techniques. See, e.g., Porter, B. D.; Oldham, J. B.; He, S. L.; Zobitz, M. E.; Payne, R. G.; An, K. N.; Currier, B. L.; Mikos, A. G.; Yaszemski, M. J., J Biomech Eng 122, 286 2000; Hedberg, E. L.; Kroese-Deutman, H. C.; Shih, C. K.; Crowther, R. S.; Carney, D. H.; Mikos, A. G.; Jansen, J. A., Biomaterials 26, 4616 2005; and Hedberg, E. L.; Shih, C. K.; Lemoine, J. J.; Timmer, M. D.; Liebschner, M. A. K.; Jansen, J. A.; Mikos, A. G., Biomaterials 26, 3215 2005; each of which is hereby incorporated by reference. More recently, high internal phase emulsions (HIPEs) have been used. See e.g., Christenson, E. M.; Soofi, W.; Holm, J. L.; Cameron, N. R.; Mikos, A. G., Biomacromolecules 8, 3806 2007. According to an embodiment, the present disclosure provides a method of fabricating of scaffolds using the established technique of electrospinning. Electrospinning is an attractive technique for forming polymer scaffolds for tissue engineering as it produces a network of fibers of the same order of magnitude as the biological molecules found in the extracellular matrix.

Figure 1:
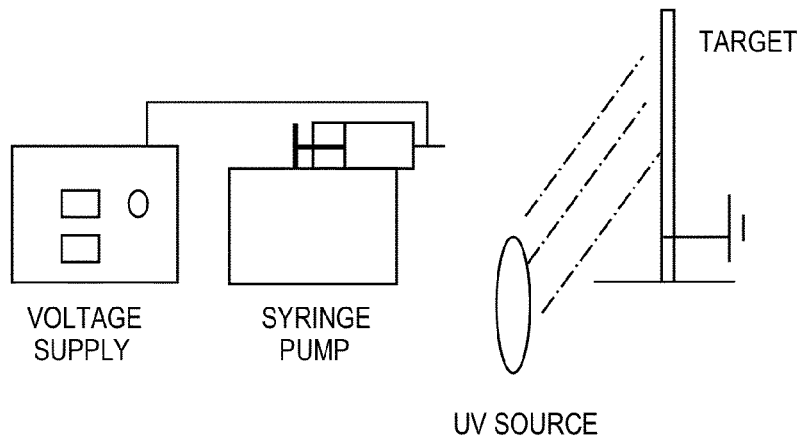
FIG. 1 is a schematic of an electrospinning setup suitable for use in the present invention.

Turning to FIG. 1, an apparatus for performing the herein described method is shown. According to this embodiment, a cross-linking agent is incorporated into the precursor polymer or oligomer solution to be electrospun. During electrospinning, the material is photo cross-linked while it is being collected on the target.

Suitable cross-linking agents include, but are not limited to, phenylbis(2,4,6-trimethylbenzoyl)-phosphine oxide (BAPO), acetophenone, 2,2-dimethoxy-2-phenylacetophenone (DMPA), benzophenone, camphorquinone, ferrocene, phenyl azide and any suitable free radical generating photoinitiator Suitable polymers and oligomers include, but are not limited to, Poly(propylene fumarate) (PPF), Poly(propylene fumarate-co-propylene maleate) (PPFcPM), Poly(butylene fumarate) (PBF), Poly(butylene fumarate-co-butylene maleate) (PBFcBM), polymers or oligomers containing terminal or pendant acrylate groups, polymers or polymers or oligomers containing terminal or pendant methacrylate groups, or other phenyl azide modified polymers. It is noted that the method described herein is particularly well suited for polymers and oligomers which were previously incapable or being electrospun including those having low $T_g$s, $T_m$s, or molecular weights. According to various embodiments and for the purposes of the present disclosure, a low $T_g$ is defined as a glass transition temperature below that of ambient room temperature, a low $T_m$ is defined as a melting point below that of ambient room temperature, and a low molecular weight is defined as a molecular weight below 10,000. In some cases the molecular weight may be lower than 10,000 such as 6000, 2000, 1000, 500 or lower. However, polymers having higher $T_g$s, $T_m$s or molecular weights are also suitable for use with the presently described methodologies. Furthermore it is noted that unlike previous methodologies wherein low $T_g$ polymers were formed into fibers by encasing them in high $T_g$ polymers, the methods of the present invention can be utilized to make fibers and, indeed, textiles formed exclusively from low $T_g$, $T_m$, or low molecular weight polymers and/or monomers.

Alternatively, rather than incorporating the cross-linking agent into the solution, the polymer (or oligomer) to be electrospun may be decorated with a photoactive moiety that enables cross-linking. Those of skill in the art will be familiar with polymer modification techniques that may be utilized to decorate polymers and oligomers. For example, polymers containing functional groups such as aldehyde, alkene, alkyne, azides, amine, carboxylic acids, cyanates, cyclic ethers, epoxy, esters, halide, hydroxyl, isocyanates, ketones, nitriles, and thiols can all be functionalized with photoactive groups. Polymers can be carbon based, ether based, ester based, urea based, or silicone based materials. Polymers can be functionalized with one or more, preferably more photoactive groups that form direct carbon-carbon bonds such as a acetylene, acrylate, cinnamate, fumarate, maleate, methacrylate, or olefinic groups with or without the addition of a photogenerated radical initiator. Alternatively, polymers or oligomers can be modified with one or more, preferably more groups that can be polymerized or cross-linked with the use of a photogenerated catalyst including both photoacid and photobase generators. Functional groups which can be photopolymerized using acid or base catalysis include groups such as cyclic ethers, and epoxy and all negative tone photoresists. Alternatively, polymers or oligomers can be modified with one or more, preferably more groups that undergo a photoactivated click reaction such as the thiol-ene, thiol-yne, photo Huisgen, or photo induced diels-alder reaction.

Furthermore, rather than, or in addition to, modifying the polymers (or oligomers) with a photoactive group, the polymers may be modified with or otherwise incorporate other desirable materials in order to produce textiles having desired physical or chemical properties or characteristics. These polymer composites may include conductive and non-conductive fillers such as single-walled carbon nanotubes, multi-walled carbon nanotubes, metal based micro- or nano-particles, carbon based micro- or nano-particles, ceramic micro- or nano-particles, semiconductor micro- or nano-particles, and pharmaceutical agents.

Figure 2:
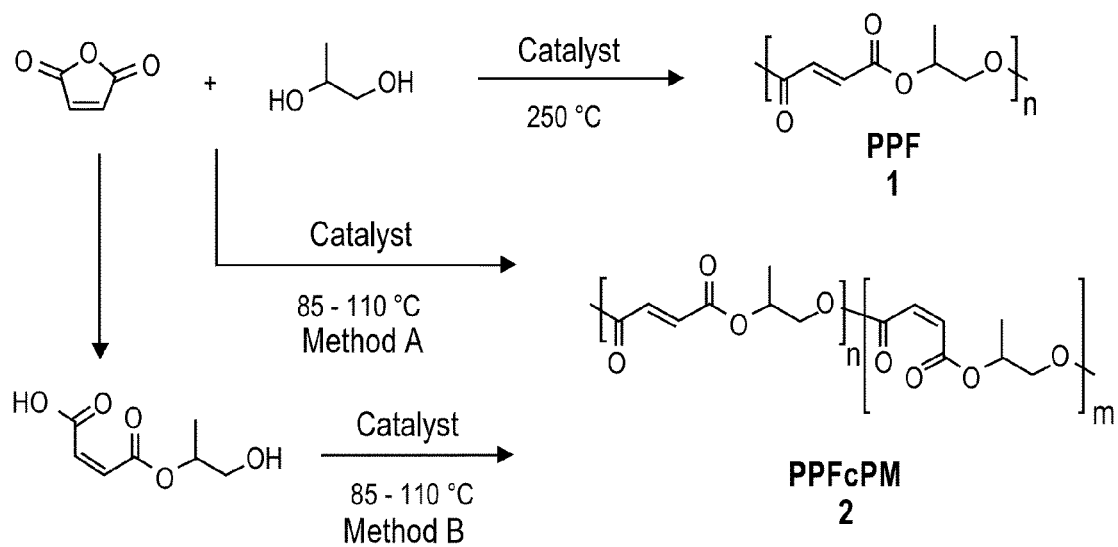
FIG. 2 depicts an exemplary synthesis scheme for the production of PPF and PPFcPM according to embodiment of the present disclosure.

As stated above, suitable polymers and oligomers include, but are not limited to, Poly(propylene fumaratefumarate) (PPF), Poly(propylene fumarate-co-propylene maleate) (PPFcPM), Poly(butylene fumarate) (PBF), Poly(butylene fumarate-co-butylene maleate) (PBFcBM). According to an embodiment, the present disclosure provides novel methods for synthesizing PPF, PPFcPM, and PBFcBM. An exemplary synthesis scheme for the production of PPF and PPFcPM is shown in FIG. 2 and it will be appreciated that a similar synthesis route can be used to produce PBFcBM. As described in greater detail in the Experimental section below, in scheme 1, PPF and PPFcPM are synthesized via step growth polycondensation reactions. As shown in FIG. 3, scheme 1 was performed under three different sets of conditions. The first reaction shows a high temperature synthesis where the maleate is isomerized to the fumarate. The second reaction (method A) shows the same reaction as the first one but done at a lower temperature with the use of a catalyst. The third reaction (method B) shows a low temperature ring opening reaction to make an advanced monomer that again can be polymerized via a condensation reaction in the presence of a catalyst to form the copolymer. Since the polymerization starting materials are different for method A and B the final product molecular weights and cis:trans double bond ratios are different.

According to yet another embodiment, the present disclosure provides bioengineered constructs having a biodegradation rate that is measurably higher than that of similarly prepared bioengineered constructs formed from PPF.

According to an embodiment, the present disclosure provides a bioengineered construct formed from poly(butylene fumarate) PBF. As a crosslinkable unsaturated linear polyfumarate system, PBF is analagous to PPF. However, as described in greater detail below, PBF has a significantly accelerated degradation rate compared to identically prepared PPF having the same molecular weight.

Figure 17:
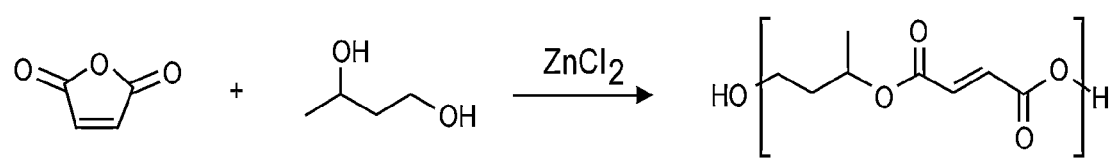
FIG. 17 is an exemplary synthesis scheme for PBF from Maleic Anhydride (MA) and 1,3-butanediol (BD).

According to an exemplary method, and as shown in FIG. 17, PBF may be synthesized via an acid catalyzed ring opening reaction of maleic anhydride (MA) and 1.3-butanediol (BD), followed by an intermolecular condensation reaction and thermally induced isomerization of the double bond of the maleate group to convert it to the energetically more stable fumarate functionality. Exemplary experimental conditions are described in the Examples section below.

Figure 18:
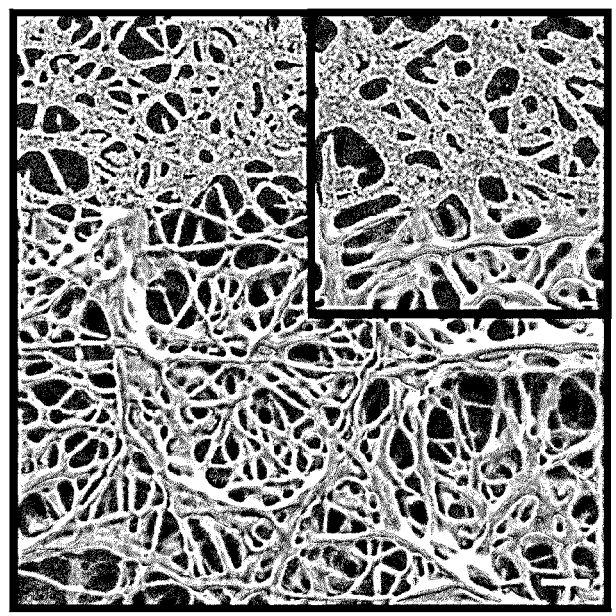
FIG. 18 shows electrospun fiberous mats produced from PBF, scale bar 100 µm and inset picture 20 µm.

According to an embodiment, porous PBF scaffolds may be formed using electrospinning techniques. According to an exemplary embodiment, fibers are formed by spinning a PBF solution at a constant rate while crosslinking in-situ as fibers are formed and collected on a grounded target. The resulting construct is a porous scaffold with a high surface area to volume ratio. FIG. 18 shows electrospun fiberous mats produced from PBF, scale bar 100 μm and inset picture 20 μm. Cytotoxicity studies showed the structures to be entirely biocompatible.

According to yet another embodiment, the present disclosure provides methodologies that enable the formation of biocompatible polymer materials having sufficient rigidity and porosity for use as tissue scaffolding constructs, wherein the materials have a controlled and predictable monomer stoichiometry, resulting in a tunable system that produces constructs having a desired degradation rate. In general, such a construct may be formed by blending together two monomer wherein each monomer is selected to have specific qualities. For example, a first monomer is typically selected as homopolymers fabricated from the monomer have certain desired degree of structural rigidity necessary for the desired construct. The first monomer may many be multifunctional such that linear, branched, hyperbranched, or dendromer polymers may be formed. The second monomer is typically selected to produce polymers which have a slightly modified, by which is meant less rigid, backbone compared to the first polymer. In essence, the second monomer is selected such that the co-polymer that is formed when the two monomers are blended together will have a specific, desired stoichiometry that results in the presence of kinks or other structural formations that increase the degradation rate of the copolymer relative to the homopolymer fabricated from the first monomer.

For embodiments wherein the copolymer is to be used as a tissue scaffolding construct, it will be appreciated that the first and second monomers should be biocompatible and non-toxic. Exemplary monomers include, but are not limited to Poly(propylene fumarate) (PPF), oligo(propylene fumarate), oligo(butylene fumarate), Poly(butylene fumarate) (PBF), 1,3-butanediol (BD), 1,4-dihydroxybut-2-yne, succinic anydride, maleic anhydride, Polylactic co-glycolic acid (PLGA) and the like.

As described above and in the Examples section, the present disclosure provides a synthesis method for producing various biocompatible constructs containing fumarate and maleate wherein the copolymers are synthesized from maleic anhydride (MA) via a polycondensation reaction. This synthesis route introduces a cis double bond into the polyester backbone, producing a polymer that has a higher degradation rate than the polymer without the cis double bond. However, this synthesis method does not enable easy control of the ratio of fumarate:maleate in the final copolymer. Accordingly, the present disclosure provides a synthesis route that enables easy control of the fumarate:maleate ratio in the final copolymer.

Accordingly, the present disclosure provides copolymers formed from blending fumarate and maleate groups at a specific, predetermined ratio in order to produce a copolymer having a specific, known density and/or degradation rate, and methods for synthesizing the same. According to this embodiment the method may comprise, for example, blending maleate and fumarate monomers in a predetermined ratio with a polyalcohol species. Exemplary polyalcohol species include, but are not limited to, 1,3-Butanediol, 1,2-propane diol, glycerol, glucose, fructose, galactose, xylose, and ribose. Exemplary maleate monomers may include Maleoyl chloride (MCl). Exemplary fumarate monomers include fumaryl chloride (FCl). As explained in greater detail below, some embodiments may require that the reaction be carried out at low temperature (i.e. below 10° C.) and/or with an inert gas sparge. Suitable inert gasses include, for example, nitrogen and argon.

Importantly, MCl is not commercially available. Accordingly, a novel synthesis route for MCl is also described herein. According to an embodiment, the starting material for MCl synthesis is maleic anhydride, which is commercially available. A ring opening reaction conducted at room temperature using water as the solvent and reactive species may be used to prepare maleic acid. The maleic acid can be converted to the MCl using thionyl chloride ($SOCl_2$). The reaction to form the acid chloride may be kept at room temperature while the reaction progresses in order to minimize the thermal isomerization of the maleate functional group to the more thermodynamically stable fumarate functional group. Upon reaction completion, the excess thionyl chloride can be removed in-vacuo. The crude MCl can then be dissolved in chloroform (CHCl$_3$) and filtered via a schlenk line, in order to remove any unreacted maleic acid, which is not soluble in CHCl$_3$.

Figure 19:
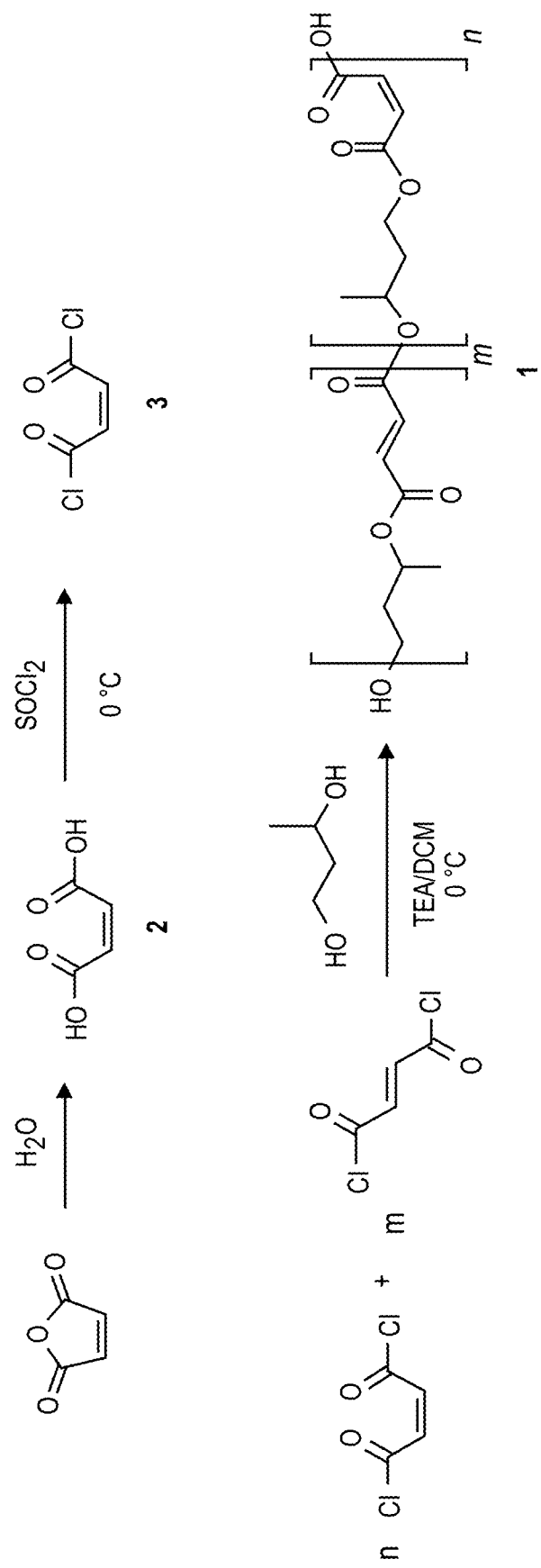
FIG. 19 is an exemplary synthesis scheme for PBFcBM from Maleoyl Chloride (MCl) and fumaryl chloride (FCl).

According to an embodiment, the present disclosure provides a method for producing a material derived from maleic acid which enables biocompatible constructs formed from (butylene fumarate)-co-(butylene maleate) (PBFcBM) and a novel synthesis route to produce PBFcBM, which results in an unsaturated polyester with controlled fumarate:maleate ratios. An exemplary synthesis route is shown in FIG. 19. In general, the co-polymer is produced by a low temperature esterification using FCl and MCl with butane diol (BD) in the presence or absence of a proton scavenger such as TEA. The low temperature inhibits the thermal isomerization of the maleate to the more stable fumarate. As demonstrated by Table 1, the maleate:fumarate ratio in the final copolymer can easily be controlled by the ratio of fumarate:maleate in the starting materials.

TABLE 1

Summary of PBFcBM polymer characterization

| Fumarate:Maleate (Starting Material) | Fumarate:Maleate (Product) | $T_g$ (° C.) | Mn | PDI | Density (g/ml) |
|---|---|---|---|---|---|
| 100:0 | 100:0 | −34.57 | 834 | 1.89 | 1.207 |
| 75:25 | 78:22 | −35.39 | 804 | 1.67 | 1.175 |
| 50:50 | 51:49 | −37.68 | 697 | 1.58 | 1.114 |
| 25:75 | 27:73 | −39.12 | 746 | 1.30 | 1.077 |

Figure 20:
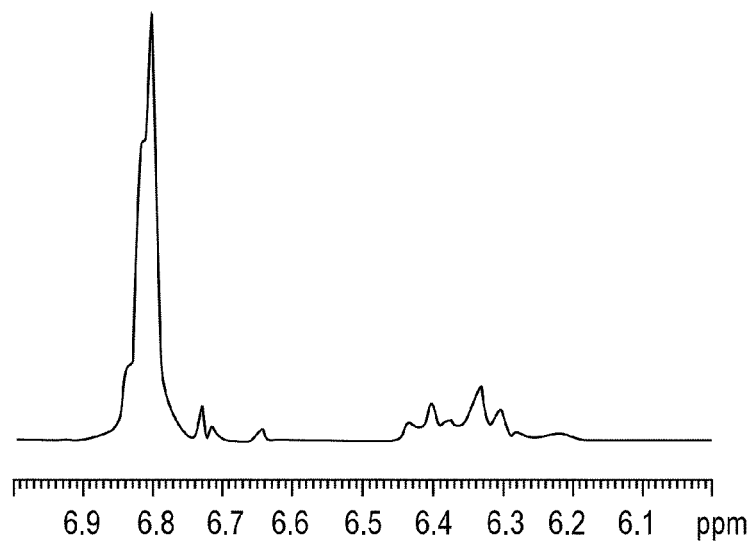
FIG. 20 is a graph showing the $^1$H NMR of PBFcBM, at a Fumarate:Maleate ratio of 75:25 where the peak at 6.8-6.9 ppm corresponds to the fumarate olefins and the peak at 6.1-6.3 indicates the olefins associated with the maleate.
Figure 21:
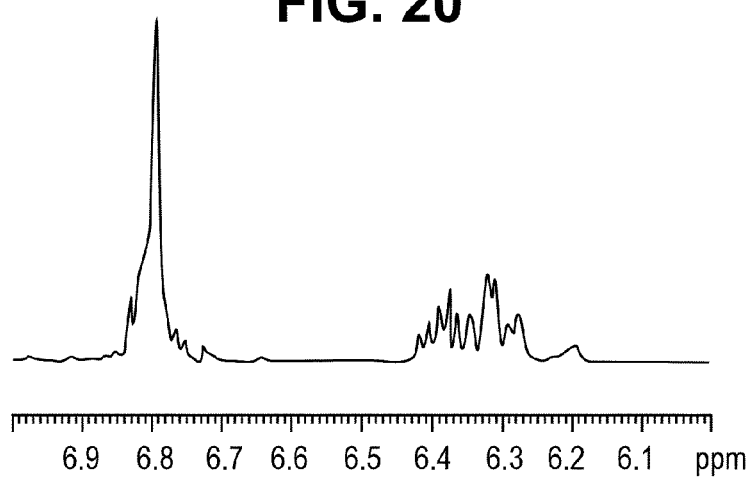
FIG. 21 is a graph showing the $^1$H NMR of PBFcBM, at a Fumarate:Maleate ratio of 50:50 where the peak at 6.8-6.9 ppm corresponds to the fumarate olefins and the peak at 6.1-6.3 indicates the olefins associated with the maleate.
Figure 22:
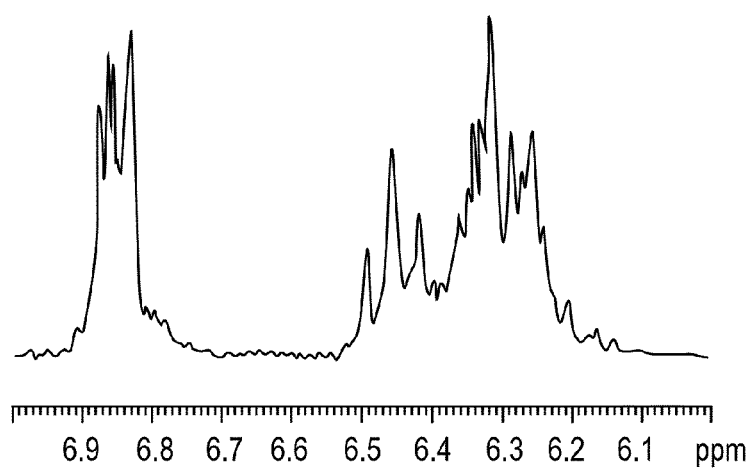
FIG. 22 is a graph showing the $^1$H NMR of PBFcBM, at a Fumarate:Maleate ratio of 25:75 where the peak at 6.8-6.9 ppm corresponds to the fumarate olefins and the peak at 6.1-6.3 indicates the olefins associated with the maleate.
Figure 23:
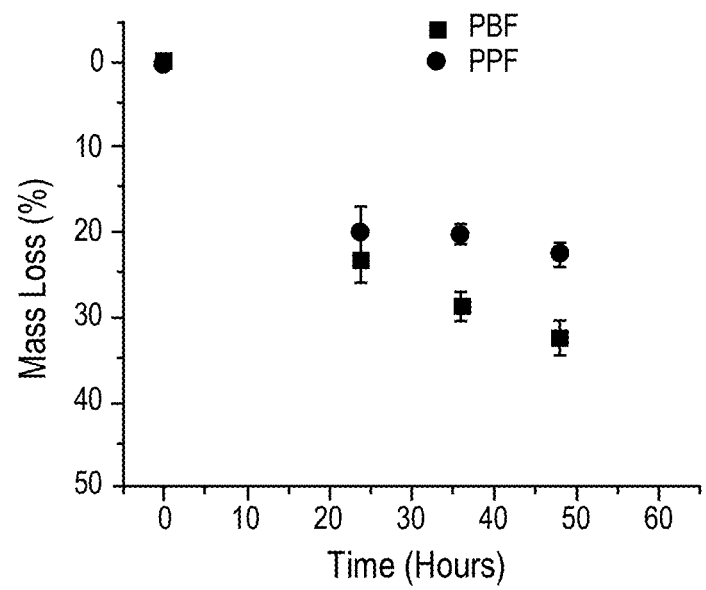
FIG. 23 is a graph showing the percent mass loss of PPF and PBF up to 48 hours under accelerated degradation conditions.
Figure 24:
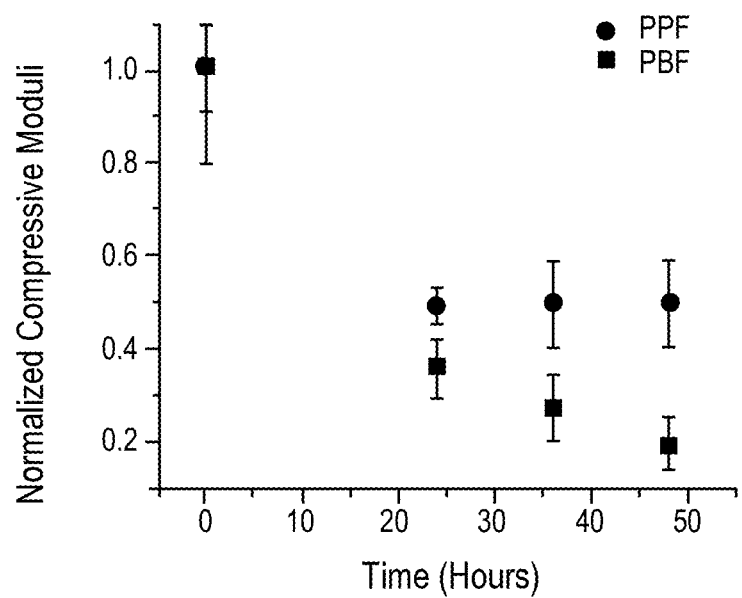
FIG. 24 is a graph showing the normalized compressive moduli for PBF as compared to PPF up to 48 hours under accelerated degradation conditions.

As demonstrated by the table above and the Examples section below, several ratios of FCl:MCl (75:25, 50:50 and 25:75) were used with BD to yield PBFcBM with known fumarate:maleate in the final polyester. $^1$H NMR was used to confirm the ratio of fumarate to maleate functionality (See FIGS. 20-22). All of the polymers had slightly lower amounts of maleate functionality, which is consistent with a small amount of thermal isomerization to the more stable fumarate functional group. FTIR data collected examining the spectral region from 1600 wavenumbers/cm to 1700 wavenumbers/cm further confirmed the $^1$H NMR determinations of fumarate to maleate ratio.

All of the PBFcBM copolymers synthesized here were evaluated using gel permeation chromatography (GPC) as well as differential scanning calorimetry (DSC) in order to determine molecular weight (Mn) and glass transition temperature ($T_g$) of the various fumarate:maleate polymers synthesized (Table 1, above). The molecular weights were in the range of 746 to 834 with a PDI ranging from 1.30 to 1.89. The molecular weights of all the polymers were low which is not unexpected given that the reaction mechanism for the esterification reaction is step growth. In general, it is expected that the presently described methods can typically produce copolymers having a molecular weight of less than 10000. For step growth mechanisms variation from a 1:1 ratio of reactants results in inhibition of high molecular weight polymers. All of the polymers had $T_g$ values which were well below that of room temperature and as the maleate functionality was increased the $T_g$ was shifted from −34.67 (0% maleate) to −35.39° C. (25% maleate) to −37.68° C. (50% maleate) to −39.12° C. (75% maleate). In general, it is expected that the presently described methods can typically produce copolymers with a glass transition temperature below 0° C. Confirmation that the decrease in packing density, which we hypothesized, would have an effect on the polymer density was carried out using a weighed glass vial and distilled water with a known density. As more maleate was incorporated in the polymer backbone the density decreased accordingly (see Table 1). The densities of the polymers decreased with increasing maleate functionality indicating a larger amount of cis double bond induced defects to the packing density.

As stated above, one anticipated utility of the presently described copolymer is its use as a biologically compatible construct such as a tissue scaffold. As described above, this may involve crosslinking the copolymer. Accordingly, if it is desirable to crosslink the copolymer, the methodologies described herein where the copolymer is synthesized without the presence of proton scavenger may be preferred. All polymers prepared with a N$_2$ sweep and lack of proton scavenger (e.g., TEA) were readily crosslinked.

Accordingly, the present disclosure provides a variety of polymers and copolymers suitable for use as biologically compatible constructs and, as a non-limiting specific example, in the formation of degradable tissue scaffolds. The present disclosure further provides methods for synthesizing these polymers and copolymers. According to various embodiments the polymers and copolymers described herein have degradation rates that are substantially higher than those of previously described polymers suitable for the same uses. According to still further embodiments, the present disclosure provides copolymers having a synthesis route which enables one to fine tune the degradation rate by selecting the specific stoichiometry of the monomers in the resulting copolymer. According to yet another embodiment, the present disclosure provides a novel synthesis route for maleoyl chloride which yields monomers suitable for use in the copolymer synthesis methods described herein. Additional details may be found in the Examples section below.

It will be appreciated that while the present disclosure describes synthesis schemes for polymers and copolymers, the presently described methodologies can easily be applied to produce oligomers as well and then the present description covers chains of monomers of any suitable length.

All patents and publications referenced or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications. It will be appreciated that the specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

EXPERIMENTS

I. Poly(Propylene-Fumarate) (PPF) and Poly(Propylene Fumarate)-Co-(Propylene Maleate) (PPFcPM) Synthesis, Construct Formation, and Characterization General Procedure. All reactions were carried out under a dry atmosphere unless noted. $^1$H nuclear magnetic resonance (NMR) was carried out on a 400 MHz Bruker DRX-AVANCE. Proton chemical shifts (δ) are reported as shifts from the internal standard tetramethylsilane (TMS). Infrared Spectroscopy (IR) was carried out on a Nicolet 6700 FTIR. Gel Permeation Chromatography (GPC) molecular weight determinations were performed by GPC using a Polymer Labs 220 PL-GPC equipped with a UV-Vis detector. Two columns (PLgel 5 μm MiniMIC-C, 250×4.6 mm) and a guard column (PLgel 5 μm MiniMIX-C, 50×4.6 mm) were used in series with a flow rate of 0.4 mL/min and a run pressure of 6.0 MPa. Chloroform was used as the eluent (0.4 mL/min), and measurements were performed at 35° C. Calibration was performed using polystyrene standards with a narrow molecular weight distribution (Fluka ReadyCal 400-2,000,000). Scanning electron microscopy (SEM) was carried out using a Zeiss Supera 55VP and a FEI DB235. Differential Scanning calorimeter (DSC) measurements, used to determine $T_g$, were performed using a TA Instruments DSC100. Viscosity determination was done using a Brookfield DV-E Viscometer, reported in cP (60 rpm, spindle #14). p-Toluensulfonic acid (TsOH), monohydrate 99%, extra pure was purchased from Acros. Ethyl acetate, HPLC grade, anhydrous magnesium sulfate ($MgSO_4$), anhydrous and sulfuric acid, certified ACS plus were purchased from Fisher. 1,2-Propanediol, 99% (PD), maleic anhydride (MA), briquettes 99%, Zinc chloride, anhydrous powder≥99.995% trace metals, Iron (III) Chloride, reagent grade 97%, phenylbis(2,4,6-trimethylbenzoyl)-phosphine oxide, 97% and benzyl, 98% were all purchased from Aldrich. All chemicals were used as received from suppliers.

General Method A Poly(Propylene Fumarate-co-Propylene Maleate) Synthesis. MA, PD, toluene and catalyst were added to a round bottom flask equipped with stir bar and Dean-Stark (DS) trap for azeotropic distillation. The reaction was allowed to proceed at a maximum temperature of 110° C., until no more distillate (water) was collected. The reaction mixture was cooled to RT, upon cooling toluene was removed in vacuo, the crude polymer was then dissolved in ethyl acetate (EtOAc) and washed with distilled water (3×). The organic layer was then dried over anhydrous $MgSO_4$ and solvent again removed in vacuo.

General Method B Poly(Propylene Fumarate-co-Propylene Maleate) Synthesis. MA, PD and toluene were added to a round bottom flask. The reaction mixture was heated to 50° C. and stirred overnight. The reaction mixture was allowed to cool to RT and the toluene was removed in vacuo. The reaction flask was then equipped with a DS trap and condenser to collect water through azeotropic distillation during the second reaction. Next, a protic acid catalyst was added to the product of the first reaction, and the mixture heated to a maximum temperature of 110° C., until the appropriate volume of water was collected. The reaction mixture was allowed to cool to RT, the solvent was removed in vacuo, and the crude polymer was dissolved in ethyl acetate and washed with distilled water (3×). Finally, the organic layer was dried over anhydrous $MgSO_4$ and solvent removed in vacuo.

PPF Synthesis (1). MA (10.0 g, 102 mmol), PD (7.8 g, 102 mmol), and tosic acid (0.02 g, 0.11 mmol) was added to a 100 mL round bottom flask equipped with a stir bar and distillation head. The reaction mixture was heated to 250° C. with stirring. After 3 hrs, the reaction was allowed to cool to RT. The resulting viscous crude polymer was dissolved in ethyl acetate (50 mL) and washed with distilled water (50 mL, 3×). The organic layer was dried over anhydrous $MgSO_4$, filtered and solvent removed in vacuo to yield a slightly yellow viscous polymer. IR (neat) 2984.1, 1714.7, 1645.4, 1454.7, 1379.0, 1290.2, 1255.5, 1153.4, 1116.2, 1075.9, 1022.5, 979.1, 837.3, 753.5, 666.4 cm-1. $^1$H NMR (400 MHz, CDCl$_3$) δ 6.88-6.78 (m, —C$\underline{H}$=C$\underline{H}$—), 5.25-5.2 (m, —C$\underline{H}$(CH$_3$)), 4.68-2.8 (m, —OCO—C$\underline{H}_2$—), 1.43-1.15 (m, (C$\underline{H}_3$)CH$_2$). GPC (1 mg/mL, CHCl$_3$) Mw 949 Mn 473. $T_g$ (° C.) −15.24.

Method A PPFcPM Synthesis (2). MA (10.0 g, 102 mmol), PD (7.8 g, 102 mmol) and toluene (30-50 mL) and the appropriate catalyst, TsOH (0.2 g, 1.0 mmol), H$_2$SO$_4$ (1 drop, 18N), ZnCl$_2$ (0.14 g, 1.0 mmol) or FeCl$_3$ (0.17 g, 1 mmol), were added to a 100 mL round bottom flask equipped with stir bar along with DS trap and condenser. The reaction mixture was allowed to progress overnight. The reaction was ended and brought to RT, upon cooling toluene was removed in vacuo. The crude polymer was then dissolved in ethyl acetate (50 mL) and washed with water (50 mL, 3×), drying the organic phase over anhydrous $MgSO_4$ and removing the solvent to yield a viscously clear polymer.

PPFcPM synthesized with TsOH: IR (neat) 3490.0, 3058.6, 2983.4, 1711.9, 1643.6, 1455.3, 1384.2, 1252.6, 1077.7, 983.6, 828.7, 777.3 cm-1. $^1$H NMR (400 MHz, CDCl$_3$) δ 7.17-7.14 (m, Ar), 7.09-7.03 (m, Ar), 6.83-6.76 (m, trans-C$\underline{H}$=C$\underline{H}$), 6.27-6.13 (m, cis-C$\underline{H}$=C$\underline{H}$—) 5.19-5.17 (bs, —C$\underline{H}$(CH$_3$)), 4.34-3.61 (m, —OCO—C$\underline{H}_2$—), 2.26 (s, C$\underline{H}_3$—Ar), 1.25-1.03 (m, (C$\underline{H}_3$)CH$_2$—). GPC (1 mg/mL, CHCl$_3$) Mw 995 Mn 728. $T_g$ (° C.) −40.38.

PPFcPM synthesized with ZnCl$_2$: IR (neat) 3516.3, 3079.6, 2984.3, 2943.7, 2883.4, 1711.1, 1644.0, 1452.5, 1381.1, 1356.2, 1289.2, 1251.9, 1224.0, 1149.6, 1116.0, 1075.9, 1019.6, 978.3, 835.7, 773.5, 668.1 cm-1. $^1$H NMR (400 MHz, CDCl3) δ 7.22-7.20 (m, Ar), 7.14-7.10 (m, Ar), 6.90-6.76 (m, trans-C$\underline{H}$=C$\underline{H}$), 6.23-6.20 (m, cis-C$\underline{H}$=C$\underline{H}$—) 5.27-5.07 (m, —C$\underline{H}$(CH$_3$)), 4.40-4.02 (m, —OCO—C$\underline{H}_2$—), 2.32 (s, C$\underline{H}_3$—Ar), 1.51-1.23 (m, (C$\underline{H}_3$)CH$_2$—). GPC (1 mg/mL, CHCl$_3$) Mw 1297 Mn 824. T$_g$ (° C.) –18.66.

PPFcPM synthesized with FeCl$_3$: IR (neat) 3445.0, 3235.5, 3081.1, 2985.9, 2661.0, 2362.5, 1716.2, 1751.0, 1700.4, 1646.7, 1455.9, 1386.3, 1355.4, 1324.4, 1279.4, 1190.8, 1121.8, 1080.2, 990.2, 838.6, 775.3 cm-1. $^1$H NMR (400 MHz, CDCl3) δ 6.93-6.83 (m, trans-C$\underline{H}$=C$\underline{H}$), 6.33-6.23 (m, cis-C$\underline{H}$=C$\underline{H}$—) 5.27-5.10 (m, —C$\underline{H}$(CH$_3$)), 4.40-4.10 (m, —OCO—C$\underline{H}_2$—), 1.44-1.23 (m, (C$\underline{H}_3$)CH$_2$—). GPC (1 mg/mL, CHCl$_3$) Mw 1871 Mn 1043. T$_g$ (° C.) –37.58.

PPFcPM synthesized with H$_2$SO$_4$: IR (neat) 3526.2, 3079.3, 2984.1, 1716.1, 1645.5, 1558.5, 1541.9, 1508.1, 1456.2, 1379.8, 1253.1, 1217.4, 1150.1, 1113.8, 1074.7, 977.1, 833.2, 773.2 cm-1. $^1$H NMR (400 MHz, CDCl3) δ 7.23-7.20 (m, Ar), 7.15-7.10 (m, Ar), 6.88-6.82 (m, trans-C$\underline{H}$=C$\underline{H}$), 6.34-6.24 (m, cis-C$\underline{H}$=C$\underline{H}$—) 5.24 (bs, —C$\underline{H}$(CH$_3$)), 4.77-4.00 (m, —OCO—C$\underline{H}_2$—), 2.32 (s, C$\underline{H}_3$—Ar), 1.44-1.21 (m, (C$\underline{H}_3$)CH$_2$—). GPC (1 mg/mL, CHCl$_3$) Mw 672 Mn 330. T$_g$ (° C.) –12.86.

Method B PPFcPM Synthesis (2). MA (10.0 g, 102 mmol), PD (7.8 g, 102 mmol) and toluene (15 mL) were added to a 100 mL round bottom flask equipped with a stir bar. Under a nitrogen blanket, the reaction heated to 50° C. with stirring was allowed to run overnight. The next day, the reaction mixture was allowed to cool to RT and the solvent removed in vacuo. The reaction flask was then equipped with a DS trap and condenser. To the product of the first reaction, toluene and either tosic acid (0.2 g, 1 mmol) or sulfuric acid (1 drop, 18 N) was added. The reaction was allowed to run until 1.6 mL of water was collected via the DS trap. The reaction was allowed to come to RT and the solvent was removed in vacuo. The crude polymer was then dissolved in ethyl acetate (50 mL) and washed with water (50 mL, 3×). The organic layer was dried over MgSO$_4$ with filtration and the solvent was removed in vacuo to yield a slightly yellow viscous polymer.

PPFcPM synthesized with TsOH: IR (neat) 2985.9, 1721.6, 1691.3, 1644.4, 1454.6, 1381.1, 1289.9, 1252.0, 1215.8, 1152.4, 1116.1, 1075.4, 979.0, 838.2, 774.3, 736.5, 669.0 cm-1. $^1$H NMR (400 MHz, CDCl3) δ 6.86-6.83 (m, trans-C$\underline{H}$=C$\underline{H}$—), 6.29-6.23 (m, cis-C$\underline{H}$=C$\underline{H}$—), 5.24 (bs, —C$\underline{H}$(CH$_3$)), 4.78-3.44 (m, —OCO—C$\underline{H}_2$), 1.32-1.17 (m, (C$\underline{H}_3$)CH$_2$—). GPC (1 mg/mL, CHCl$_3$) Mw 11388 Mn 2347. T$_g$ (° C.) –13.78.

PPFcPM synthesized with H2SO$_4$: IR (neat) 2985.7, 1717.7, 1643.6, 1454.7, 1382.5, 1253.8, 1151.8, 1116.5, 1075.3, 978.7, 889.8, 838.1, 7775.0, 734.6, 694.8 cm-1. $^1$H NMR (400 MHz, CDCl$_3$) δ 7.24-7.21 (m, Ar), 7.16-7.11 (m, Ar), 6.83 (s, trans-C$\vec{H}$=C$\vec{H}$—), 6.25 (s, cis-C$\vec{H}$=C$\vec{H}$—) 5.26 (bs, —C$\vec{H}$(CH$_3$)), 4.78-2.75 (m, —OCO—C$\vec{H}_2$—), 2.33 (s, C$\vec{H}_3$—Ar), 1.33-1.17 (m, (C$\vec{H}_3$)CH2-). GPC (1 mg/mL, CHCl$_3$) Mw 5520 Mn 1739. T$_g$ (° C.) –13.78

General Procedure for Electrospinning. All polymer solutions were delivered at a constant rate via a syringe pump (KD scientific, model 100s); through a syringe fitted with stainless steel blunt tip needle (Small Parts, Inc.). The needle was charged through a high voltage supply (Glassman High Voltage, Inc. Series EL), and the resulting polymer fibers were collected on a grounded target (6×6 in$^2$ Cu plate fitted with Al foil). A UV source (UVP, Blak-Ray longwave ultraviolet lamp, model B100AP, λ=365 nm) was used to crosslink polymer solution in-situ (FIG. 2).

Electrospinning PPF and PPFcPM. A 2 mL plastic syringe (inner diameter (ID)=4.64 mm) equipped with a 20 gauge (g)×1.5 in. stainless steel blunt tip needle was used to deliver solutions of polymer dissolved in chloroform (40, 50 and 60 wt %) at a volumetric flow rate of 0.2 mL/hr and a voltage difference of 1 kV/cm from needle tip to collection plate.

Crosslinking While Electrospinning PPF and PPFcPM. A 2 ml plastic syringe (ID=4.64 mm) equipped with a 20 g×1.5 in stainless steel blunt tip needle was used to deliver a 50 wt % polymer solution with a 3 wt % initiator (benzil or phenylbis (2,4,6-trimethylbenzoyl)-phosphine oxide (BAPO)) in chloroform. The polymer solution was spun at a constant rate of 0.1 mL/hr and a voltage of 1 kV/cm, from needle tip to collection plate. While the polymer was being collected on the target it was being crosslinked via the UV source.

Crosslinked PPFcPM: IR (neat) 2957.6, 1719.1, 1643.6, 1453.2, 1382.9, 1254.2, 1209.4, 1150.8, 1114.3, 1073.3, 978.7, 813.9, 752.7, 667.5 cm-1.

Results and Discussion

Poly(propylene-fumarate) (PPF) and poly(propylene fumarate)-co-(propylene maleate) (PPFcPM) were synthesized via step growth polycondensation reactions (FIG. 1). The glass transition temperatures of all polymers synthesized were below room temperature and ranged from –13° C. to –40° C. (FIG. 3). PPF was synthesized via the protic acid catalyzed neat reaction of maleic anhydride with 1,2-propanediol at high temperatures (~250° C.), whereas the copolymer PPFcPM was obtained using a protic acid catalyst at lower temperatures (~85-110° C.). Two different methods were explored to synthesize the copolymer.

The first method (Method A) used to synthesize the copolymer involved a protic acid or Lewis acid catalyzed polymerization reaction carried out at 85° C. to 110° C. to azeotropically remove water. The second method (Method B) involved an initial ring opening reaction carried out at 50° C. without the use of a catalyst followed by an acid catalyzed condensation reaction in combination with azeotropic removal of water.

Figure 4:
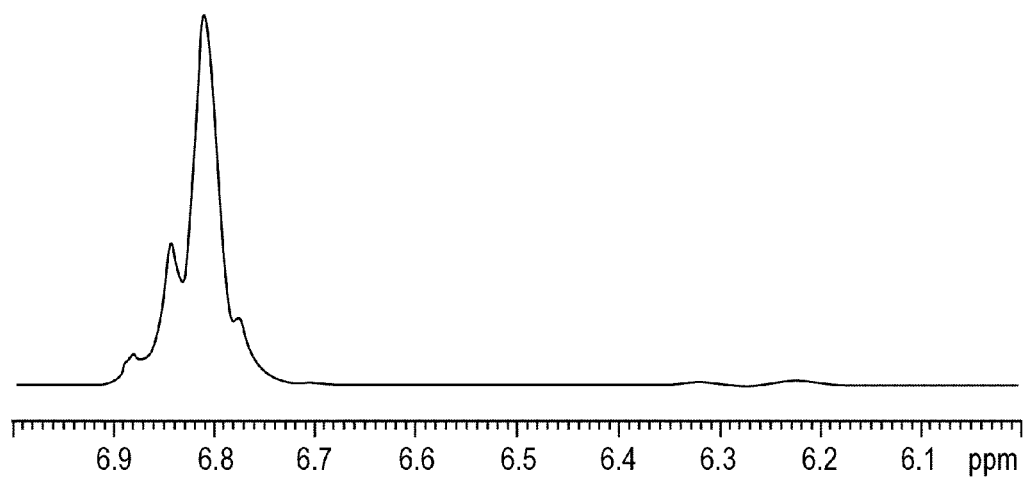
FIG. 4 depicts $^1$H NMR of PPF polymer.
Figure 5:
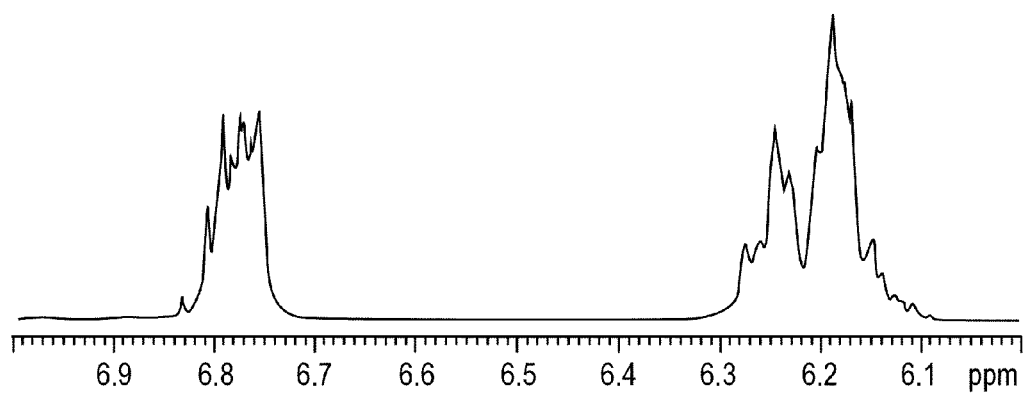
FIG. 5 depicts $^1$H NMR of PPFcPM polymer formed using Method A as described herein. The peak at 6.8-6.9 ppm corresponds to fumarate where the peak at 6.2-6.3 ppm represents the maleate.
Figure 6:
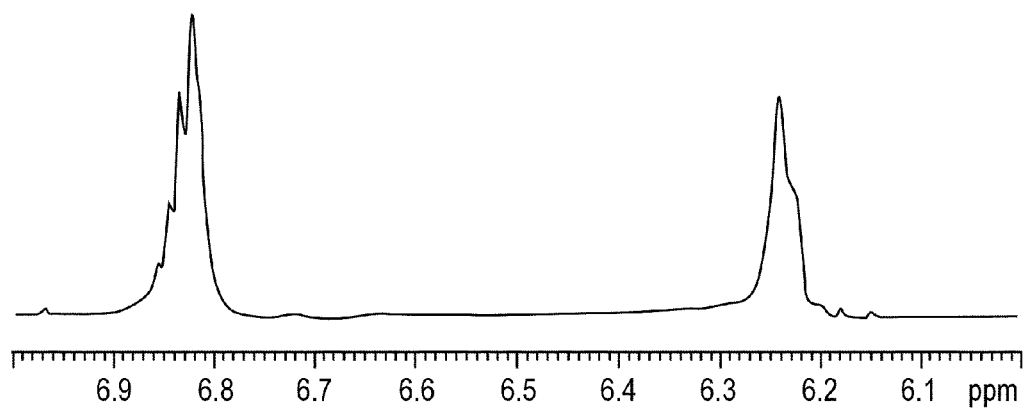
FIG. 6 depicts $^1$H NMR of PPFcPM polymer formed using Method B as described herein. The peak at 6.8-6.9 ppm corresponds to fumarate where the peak at 6.2-6.3 ppm represents the maleate.

The ratio of fumarate to maleate in the polymer was influenced by both temperature and catalyst (FIG. 3). Polymer synthesized at high temperatures (neat) produced only PPF however the molecular weight was low presumably due to side reaction products which changed the monomer stoichiometry. Since the catalytic activities of each catalyst are slightly different we can only directly compare polymerizations techniques using the same catalyst. For example, polymer synthesized at low temperatures according to Method A using TsOH yielded a polymer with 33% fumarate, whereas Method B yielded polymer that contained 55% fumarate (FIGS. 4-6). Polymer formed with mostly maleate had a very low T$_g$ when compared to polymer having a much smaller amount of maleate. Furthermore, there appears to be no correlation between T$_g$ and molecular weight as each polymer is a random copolymer.

PPFcPM synthesized using sulfuric acid as the catalyst resulted in toluene inclusion due to Friedel-Craft alkylation. See e.g., Ipatieff, V. N.; Corson, B. B.; Pines, H., J. Am. Chem. Soc. 58, 919 1936, which is hereby incorporated by reference. The influence of temperature and catalyst was also observed in all of the one step azeotropic distillation scenarios, thus providing a system which has the ability to be adjusted.

Figure 7:
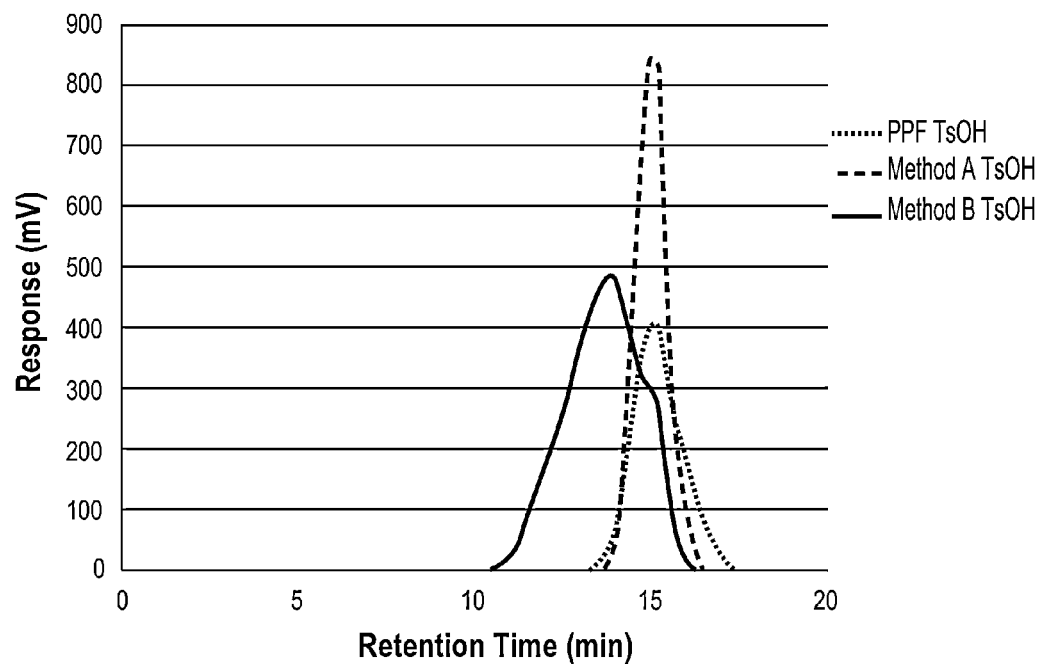
FIG. 7 depicts the GPC results, showing elution times of the PPfcPM polymer using the protic acid catalyst TsOH.

The molecular weights of all polymers produced were determined through gel permeation chromatography using narrow weight distribution polystyrene as the standards. PPF synthesized according to Method A had an average molecular weight (Mn) of 720, with poly dispersity (PDI) of 2.0. The molecular weight did not increase with longer reaction times (data not shown). The low molecular weight is consistent with the initial production of PPFcPM oligomers which thermally isomerizes to the more stable fumarate form. Presumably the high temperature results in both isomerization and side reactions that limit the polymer molecular weight by changing the step growth stoichiometry. PPF synthesized in this fashion is about 70% lower in molecular weight than other reported synthesis (see e.g., Fisher, J. P.; Holland, T. A.; Dean, D.; Engel, P. S.; Mikos, A. G., J. Biomater. Sci., Polym. Ed. 12, 673 2001, hereby incorporated by reference), however PPF is isolated via a two-step synthesis in the previously reported synthesis. PPFcPM synthesized through one step synthesis (Method A) also resulted in polymers with low molecular weights (FIG. 3). In order to increase the Mn of our polyester, a two-step synthesis (Method B) was developed. Method B did not produce PPF; it did however, produce the copolymer PPFcPM. The copolymer molecular weight was significantly higher than the copolymer produced using Method A (FIG. 7). The PPFcPM molecular weight using TsOH displayed a Mn of 2,347 and a PDI of 4.85.

Figure 8:
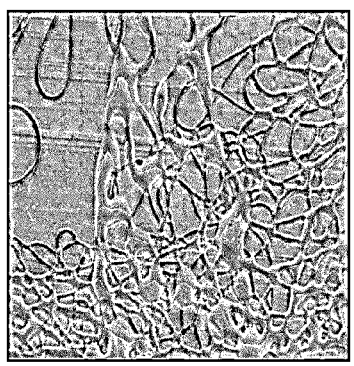
FIG. 8 depicts the effect of 40 wt % PPFcPM in chloroform produced through a two-step synthesis method described herein. The scale bar is 20 um.
Figure 9:
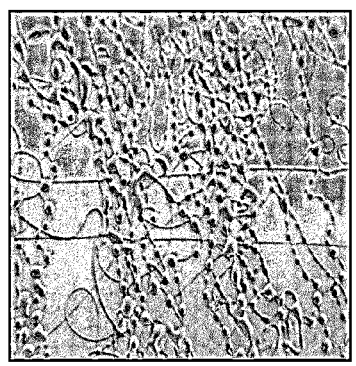
FIG. 9 depicts the effect of 50 wt % PPFcPM in chloroform produced through a two-step synthesis method described herein. The scale bar is 100 um.
Figure 10:
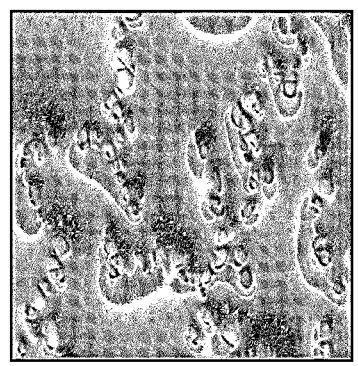
FIG. 10 depicts the effect of 60 wt % PPFcPM in chloroform produced through a two-step synthesis method described herein. The scale bar is 20 um.

To form a network of PPFcPM copolymer fibers, the copolymer was spun using standard electrospinning techniques. Three different solution concentrations ranging from 40 to 60% (w/w) dissolved in chloroform were used to determine the solution concentration that would allow for the production of continuous fibers at 1 kV/cm (FIGS. 8-10). Fibrous mats were not produced when low $T_g$ polymers were electrospun. Instead the polymer self-calendared to form one layer of a porous material. The flow rate was reduced to 0.1 ml/hr from 0.5 ml/hr in hopes of reducing the self-calendaring effect and allow for three dimensional fibrous scaffold formation. Unfortunately even with the reduced flow rate self-calendaring, due to the flow of polymer at RT, was still observed via scanning electron microscopy (SEM) imaging.

In order to produce a fibrous 3D network that did not self-calendar the copolymer was crosslinked using in-situ photopolymerization during the electrospinning process. Crosslinking the polymer before electrospinning was not possible as the polymer would no longer be soluble.

Either benzyl or BAPO was incorporated at 3% (w/w) into a PPFcPM solution (40-60% (w/w)) in chloroform, yielding a solution viscosity of 1863 cP (Brookfield DV-E) at RT. Both solutions were electrospun using the aforementioned parameters and set up. The nano- and microfibers fabricated from a polymer solution containing benzil were exposed to UV light (λ=365 nm) as they were spun and deposited onto the aluminium foil coated copper plate held at ground potential. After deposition the polymer was exposed to UV radiation for an additional 15 min. Fibers produced in this way did not exist as individual fibers but rather as a self-calendared layer (FIGS. 11, 12). Presumably too few radicals were produced to initiate photo-crosslinking during fiber formation. PPFcPM/BAPO solutions were loaded in a plastic syringe and electrospun using the same conditions as the polymer/benzyl solution. A fibrous mat was formed using BAPO as the photoinitiator. However, after 0.1 ml of solution was delivered the photo-crosslinked polymer began to form pillars (FIGS. 13, 14).

Figure 16:
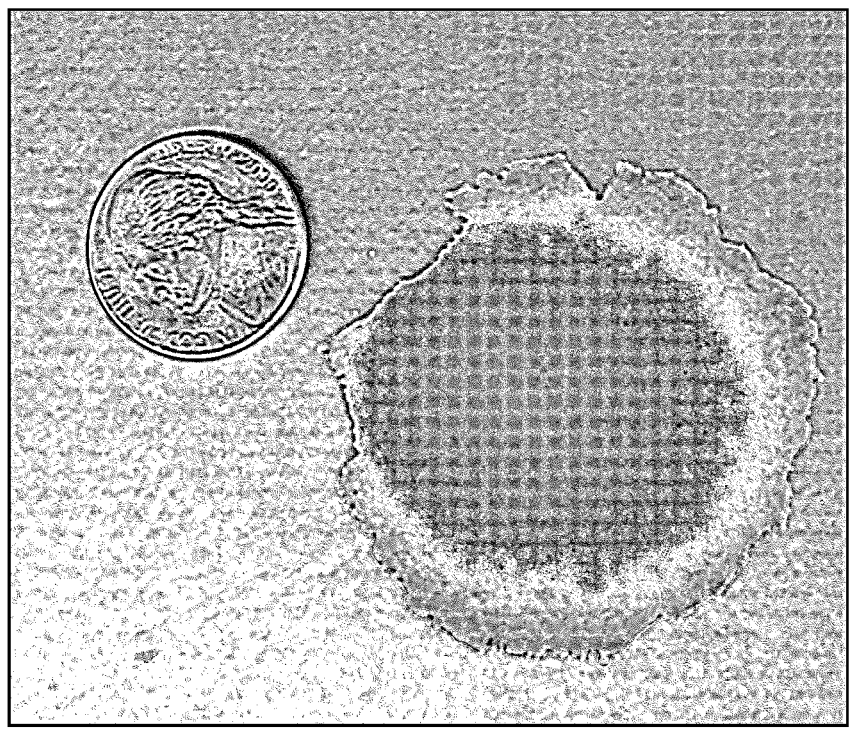
FIG. 16 shows a mat of the SEM image seen in FIG. 15.
Figure 15:
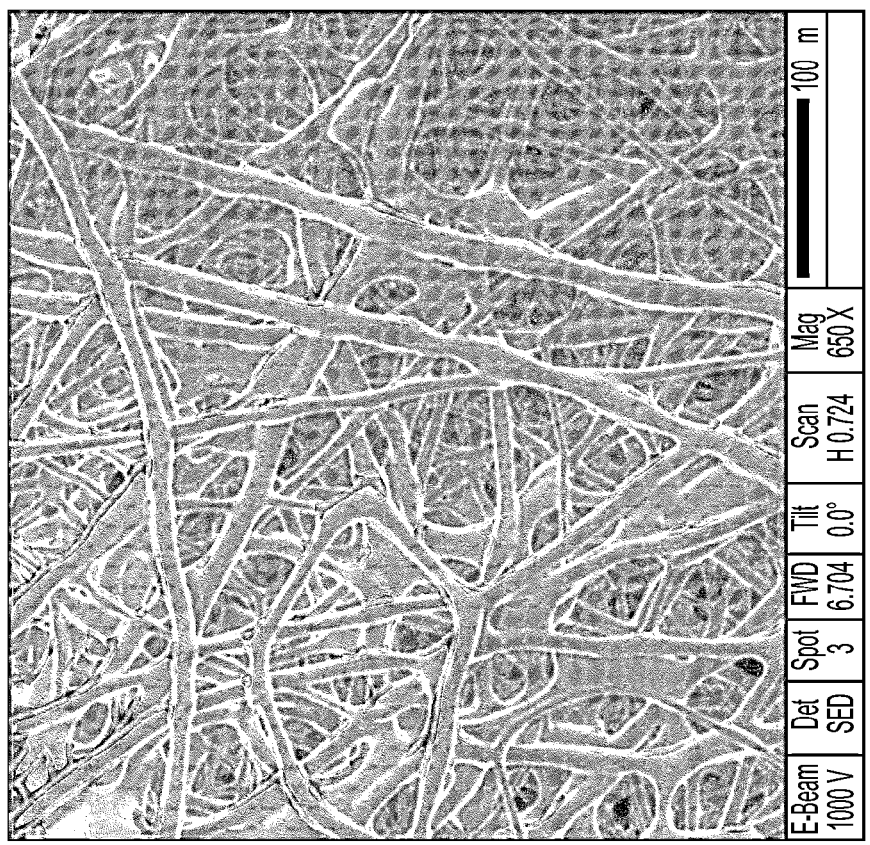
FIG. 15 depicts 50 wt % PPFcPM, 3 wt % BAPO in CHCL3. Scale bar is 100 um.

In order to determine the cause of the pillar formation, a temperature mapping of the aluminum foil coated plate was performed by splitting the aluminum foil into a 3×3 array of 2" squares to form a total of nine regions. Using an IR thermometer, the temperature was recorded in each of the regions to determine if the UV lamp was locally heating the aluminum surface, potentially leading to pillar formation. No local heating of the surface was observed over a typical period of electrospun fiber deposition. Further examination of the electrospinning apparatus revealed that the UV radiation was being reflected off of the aluminum foil exposing the PPFcPM/BAPO filled syringe, promoting photo-crosslinking of the polymer solution altering the solution viscosity. However, when the syringe was shielded from the reflected UV radiation the PPFcPM/BAPO was spun successfully and produced a non-calendared mat, free of pillar formation (FIGS. 15, 16). Using ImageJ, 30 random fibers in the SEM image were measured to determine the average fiber-diameter per sample. With the PPFcPM/BAPO conditions described above, fibers with diameters of 6.94±3.64 µm were formed. The Tg of the polymers prior to crosslinking did not significantly affect the structure of the electrospun fibers formed as they were crosslinked in-situ.

II. Poly(Butylene Fumarate) (PBF) Synthesis and Characterization

According to a specific example, MA (50 g, 0.51 mol), BD (46 g, 0.51 mol) and $ZnCl_2$ (0.70 g, 5.1 mmol) were added to a 250 mL round bottom flask equipped with a stir bar and distillation head. The reaction mixture was heated to ~200° C. with stifling through the use of a silicon oil bath, while collecting the distillate (water). Upon completion (distillate collection ceased), the reaction was allowed to come to room temperature (RT). The crude polymer was dissolved in chloroform ($CHCl_3$) (250 mL) and washed with water (250 mL, 3×). The organic layer was dried over $MgSO_4$ and solvent removed in vacuo, resulting in a yellow viscous polymer. IR (neat) 3430.5, 3231.7, 3081.2, 3027.5, 2979.1, 2937.7, 2684.8, 1743.8, 1696.8, 1646.1, 1456.4, 1382.9, 1356.2, 1317.9, 1277.1, 1189.5, 1107.7, 1046.1, 989.1, 877.4, 850.8, 756.6 and 665.7 $cm^{-1}$. $^1$H NMR (400 MHz, $CDCl_3$) δ6.91-6.73 (m, 2H), 5.13-5.07 (m, 1H), 4.32-4.15 (m2H), 2.05-1.77 (m, 2H), 1.32-1.10 (m, 3H). Mw 1777, PDI 1.78. $T_g$ (° C.) −21.64.

Figure 25:
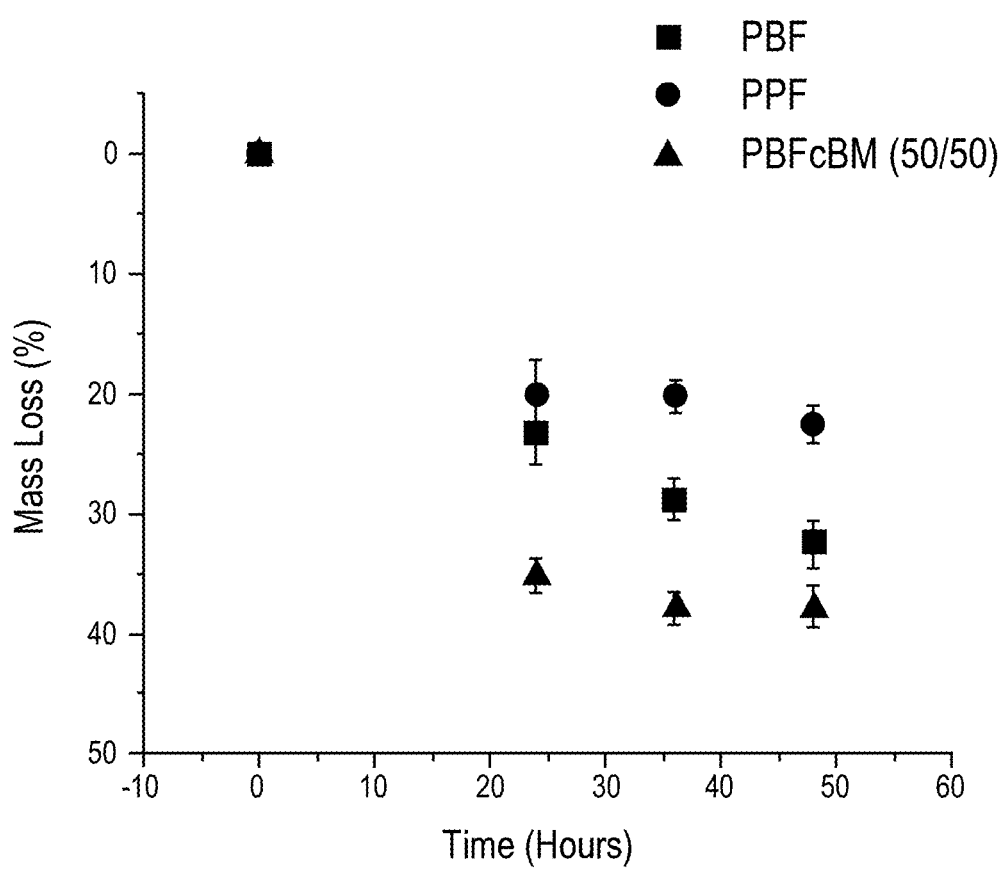
FIG. 25 is a graph comparing the mass loss percentage of PBF, PPF and 50:50 PBFcBM over time in accelerated degradation studies.

In order to confirm that PBF, made from MA, had a similar compressive strength of previously reported PPF, cylindrical samples were prepared in a 2:1 (height:diameter) sample size (n=5) and mechanical testing was carried out following ASTM D695-02a guidelines. The compressive moduli of each polymer was calculated by determining the slope in the linear region (5%-20%). PBF had a compressive moduli of 2084±118 MPa compared to 1231±136 MPa for PPF of the same molecular weight (data not shown). An accelerated degradation was carried out using PPF and PBF of similar molecular weights (1301 and 1573, respectively). Cylindrical samples were prepared using silane treated glass molds in order to ensure a clean release from the mold. Cylindrical samples made without the silane treatment tended to adhere to the glass and create micro fractures within the cylinders. After cylinder formation, the initial mass as well as the height and diameter were recorded. Samples were than incubated in 0.1N NaOH for 0, 24, 36 and 48 hrs (n=5 at each time point) and were removed and dried and the mass and compressive moduli were measured. PBF continues to experience a mass loss change, whereas PPF remains at the same mass after 24 hrs up to the duration of the incubation to 48 hrs (FIG. 25). The mass change is indicative of the fact that PBF is continuing to degrade. The PBF degradation was further confirmed by measuring the compressive moduli of both PBF and PPF at each time point throughout the accelerated degradation study (FIG. 26). Again the moduli of PBF continued to decrease whereas the compressive moduli of the PPF changed little which corroborates observed changes in mass.

III. Poly(Butylene Fumarate)-Co-(Butylene Maleate) (PBFcBM) Synthesis

Chemicals and Equipment

Nuclear magnetic resonance (NMR) was carried out on a 400 MHz Bruker DRX-AVANCE. Proton chemical shifts (δ) are reported as shifts from the internal standard tetramethylsilane (TMS). Infrared Spectroscopy (IR) was carried out on a Nicolet 6700 FTIR equipped with a continuum microscope. Gel Permeation Chromatography (GPC) molecular weight determinations were performed by GPC using a Polymer Labs 220 PL-GPC equipped with a UV-Vis detector. Two columns (PLgel 5 μm MiniMIX-C, 250×4.6 mm) and a guard column (PLgel 5 μm MiniMIX-C, 50×4.6 mm) were used in series with a flow rate of 0.4 mL/min and a run pressure of 6.0 MPa. Relative molecular weights were determined using polystyrene standards with a narrow molecular weight distribution (Fluka ReadyCal 400-2,000,000). Chloroform was used as the eluent (0.4 mL/min), and measurements were performed at 35° C. Differential Scanning calorimetry (DSC) was carried out on TA Instruments DSC Q100. Anhydrous magnesium sulfate ($MgSO_4$), silica gel sorbent 200-425 mesh, ethyl acetate (EtOAc), triethylamine (TEA), reagent grade and potassium hydroxide (KOH), were all purchased from Fisher. 1,3-Butanediol, Reagent Plus®, 99% (BD), maleic anhydride (MA), briquettes 99%, Zinc Chloride ($ZnCl_2$), phenylbis(2,4,6-trimethylbenzoyl)-phosphine oxide, 97% (BAPO) were purchased from Aldrich. Chloroform, for HPLC and Fumaryl chloride, 95% were purchased from Acros Organics. Thionyl chloride was purchased from Alfa Aesar. All chemicals were used as received from suppliers.

Degradation of PBFcBM.

PBFcBM was synthesized as described above from maleic acid (MA) and BD. Briefly, MA and BD were reacted via a ring opening step growth polymerization at low temperatures, using zinc chloride ($ZnCl_2$) and azetropically distilled water. PBFcBM containing 33 mol % maleate was evaluated. Using 1 ml glass vials (Cole Parmer, Cat # WU-98815-00) BAPO/polymer (3 wt %/g) solution was poured into the vials, followed by centrifugation (5 minutes at 3000 rpm) in order to remove defects and any air bubbles. PBFcBM was than crosslinked at λ=365 nm for 3 hrs (n=84). Molds were broken and the PBFcBM samples were cut to achieve a height:diameter of 12:6 (mm) using a wet saw (TechCut5™, Allied HighTech Inc). Samples were then placed in 20 mL scintillation vials with ~20 mL of 1× phosphate buffer solution (PBS) at pH 7.4 and allowed to incubate at 37° C. with gentle agitation (75 rpm). Samples were removed at various time points to perform mechanical testing (ASTM standard D69502a) using an Instron 6564. FIG. 25 is a graph comparing the mass loss percentage of PBF, PPF and 50:50 PBFcBM over time in accelerated degradation studies.

Synthesis of Maleic Acid (MAc) (2).

MA (0.25 mol, 25 g) and $H_2O$ (0.25 mol, 4.6 g) were added to 100 ml round bottom flask equipped with a stir bar and allowed to react overnight under $N_2$. Upon completion the product was filtered and washed with $CHCl_3$ and dried. $_1$H NMR (400 MHz, $CDCl_3$) δ 6.08 (2H, s), 4.80 (2H, s).

Synthesis of Maleoyl Chloride (MCl) (3).

MAc (69 mmol, 8.0 g) was added to a round bottom flask equipped with stir bar. Atmosphere was removed and replaced with $N_2$ (3×), while the flask was placed in an ice/water bath. $SOCl_2$ (138 mmol, 16.4 g) was added and the reaction was stirred overnight. Upon completion of the reaction, excess $SOCl_2$ was removed in vacuo producing a white powder. The powder was dissolved in $CHCl_3$ and filtered through a schlenk filter, solvent was removed in vacuo. The crude product was carried on to the next step without further purification. Melting Point (° C.) 54-55; $^1$H NMR (400 MHz, $CDCl_3$) δ 7.03 (2H, s).

Synthesis of Poly (Butylene Fumarate) (PBF).

FCl (65.4 mmol, 10 g) was added to 100 ml round bottom flask equipped with a stir bar and an addition funnel. Atmosphere was removed and replaced with $N_2$ (3×). PD (65.4 mmol, 5.9 g), TEA (78.5 mmol, 8 g) and DCM (30 ml) were added to the addition funnel, followed by dropwise addition to the round bottom containing FCl at 0° C. The reaction was allowed to progress under $N_2$ overnight. Upon completion the reaction was washed with $dH_2O$ (3×) dried over $MgSO_4$ and solvent removed in vacuo, resulting in a brown viscous polymer. $T_g$ (° C.) −34.67; IR (neat) 2980.2, 2935.2, 2362.3, 2335.6, 1724.1, 1646.3, 1558.7, 1456.5, 1380.9, 1356.6, 1300.9, 1261.5, 1225.3, 1163.1, 1105.0, 983.0, 872.5, 773.8, 668.6 cm-1; $_1$H NMR (400 MHz, $CDCl_3$) δ 6.89-8.80 (m, 2H), 5.10 (bs, 1H), 4.68-4.10 (bm, 2H) 2.06-2.00 (bm, 2H) 1.30-1.19 (m, 3H); Mn 834 PDI 1.89.

Synthesis of 75/25 Poly(Butylene Fumarate-Co-Butylene Maleate) (PBFcBM) (1).

MCl (16.34 mmol, 2.5 g) was added to a 100 ml round bottom flask, equipped with stir bar and addition funnel. Atmosphere was removed and replaced with $N_2$ (3×), FCl (51.5 mmol, 7.9 g) was added to the round bottom containing MCl. DCM (30 ml) was added to the round bottom containing MCl and FCl, to the addition funnel was added BD (67.84 mmol, 6.11 g) and TEA (74.6 mmol, 7.55 g), under nitrogen and on ice/water bath BD was slowly added to the round bottom and the reaction was allowed to progress overnight. Upon completion the reaction was washed with $dH_2O$ (3×) dried over $MgSO_4$ and solvent removed in vacuo, resulting in a brown viscous polymer. $T_g$ (° C.) −35.39; IR (neat) 3506.1, 2976.8, 1719.8, 1644.4, 1457.3, 1383.0, 1356.3, 1300.7, 1162.9, 1102.0, 981.6, 911.5, 850.3, 821.5, 757.8, 668.5, 418.4 cm-1; $_1$H NMR (400 MHz, $CDCl_3$) δ 6.87-6.76 (m, 2H), 6.43-6.28 (m, 2H), 5.13 (bs, 1H), 4.43-3.65 (bm, 2H) 2.05-1.74 (bm, 2H) 1.37-1.20 (m, 3H); (Fumarate:Maleate, 78:22); Mn 804 PDI 1.67

Synthesis of 50/50 Poly(Butylene Fumarate-Co-Butylene Maleate) (PBFcBM) (1).

Synthesized following same procedure as 75/25 PBFcBM using the following amounts, MCl (32.7 mmol, 5 g), FCl (34.3 mmol, 5.25 g), BD (67 mmol, 6.03 g) and TEA (100 mmol, 10.2 g). $T_g$ (° C.) −37.68; IR (neat) 2979.5, 2363.1, 1722.9, 1642.7, 1455.9, 1385.5, 1301.0, 1261.9, 1224.4, 1165.0, 1102.7, 1051.8, 980.7, 820.4, 756.8, 667.8 cm-1; $_1$H NMR (400 MHz, $CDCl_3$) δ 6.82-6.78 (m, 2H), 6.37-6.19 (m, 2H), 5.17-5.11 (bs, 1H), 4.29-4.06 (bm, 2H) 2.04-1.96 (bm, 2H) 1.34-1.20 (m, 3H); (Fumarate:Maleate, 51:49) Mn 697 PDI 1.58.

Synthesis of 25/75 Poly(Butylene Fumarate-Co-Butylene Maleate) (PBFcBM) (1).

Synthesized following same procedure as 75/25 PBFcBM using the following amounts, MCl (49.0 mmol, 7.5 g), FCl (17.2 mmol, 2.6 g), BD (66.2 mmol, 5.97 g) and TEA (72.8 mmol, 7.4 g). $T_g$ (° C.) −39.12; IR (neat) 3446.9, 2974.4, 1718.9, 1642.3, 1457.2, 1409.4, 1382.8, 1301.1, 1263.1, 1220.2, 1168.2, 1043.2, 982.7, 910.3, 821.5, 757.4, 668.0 cm-1; $_1$H NMR (400 MHz, $CDCl_3$) δ 6.88-6.83 (m, 2H), 6.46-6.25 (m, 2H), 5.32-5.17 (m, 1H), 4.48-3.95 (bm, 2H) 2.05-1.78 (bm, 2H) 1.41-1.24 (m, 3H); (Fumarate:Maleate, 27:73); Mn 746 PDI 1.30.

General Synthesis with No Proton Scavenger.

MCl was added to a 250 ml 3-neck round bottom flask, equipped with stir bar, addition funnel, $N_2$ sparge and hose inlet/outlet adapter. Atmosphere was removed and replaced with $N_2$ (3×), DCM (30 ml) was added to the round bottom containing MCl and FCl, to the addition funnel was added BD and DCM (10 ml) under nitrogen. Upon addition of both dichloride monomers (FCl and MCl), BD and 20 ml DCM were added drop wise to the reaction (at 0° C.), sweeping away the HCl (g) from the reaction flask via the hose inlet/outlet adapter to a beaker containing a KOH (aq) base trap. Each of the PBFcBM copolymers where synthesized using this general setup.

General Purification of Polymer.

Polymer was purified using column chromatography with silica gel as the stationary phase using EtOAc as the eluting solvent, followed by solvent removal in vacuo.

Determination of Polymer Density.

Density was measured at room temperature (RT) in weight 1 ml glass vials (Cole Parmer, Cat # WU-98815-00) comparing the sample to the same volume of distilled water (d=1.0 g/ml).

What is claimed is:

1. A biodegradable, biocompatible construct comprising a copolymer comprising a controlled, non-arbitrary ratio of repeating units of both maleate and fumarate.

2. The construct of claim 1 wherein the copolymer has a rate of degradation that is faster than poly(propylene fumarate) (PPF).

3. A biodegradable, biocompatible construct comprising a copolymer comprising repeating units of both maleate and fumarate wherein the construct has been formed by electrospinning the copolymer and photocrosslinking the polymer while the polymer fibers are formed.

4. The construct of claim 1 wherein the copolymer is formed by blending malonyl and fumaryl chloride monomers with a polyalcohol species at low temperature with an inert gas sparge.

5. The construct of claim 4 wherein the desired density of the formed copolymer is determined by the controlled, non-arbitrary ratio.

6. The construct of claim 4 wherein the polyalcohol species is butane diol or glycerol.

7. The construct of claim 3 wherein the copolymer has a rate of degradation that is faster than poly(propylene fumarate) (PPF).

8. The construct of claim 3 wherein the copolymer is formed by blending malonyl and fumaryl chloride monomers with a polyalcohol species at low temperature with an inert gas sparge.

9. The construct of claim 8 wherein the malonyl and fumaryl chloride monomers are blended together in a known ratio.

10. The construct of claim 9 wherein the desired density of the formed copolymer is determined by the known ratio.

11. The construct of claim 8 wherein the polyalcohol species is butane diol or glycerol.

* * * * *